(12) United States Patent
Fukamachi

(10) Patent No.: US 7,568,948 B2
(45) Date of Patent: Aug. 4, 2009

(54) CONNECTOR, A FORMING MOLD THEREFOR

(75) Inventor: Makoto Fukamachi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 11/928,455

(22) Filed: Oct. 30, 2007

(65) Prior Publication Data

US 2008/0102299 A1    May 1, 2008

(30) Foreign Application Priority Data

Oct. 31, 2006    (JP) .............................. 2006-295869

(51) Int. Cl.
*H01R 13/40* (2006.01)

(52) U.S. Cl. ...................................... 439/587

(58) Field of Classification Search ................ 439/587, 439/589, 271, 275, 274
See application file for complete search history.

(56) References Cited

U.S. PATENT DOCUMENTS

2003/0087551 A1* 5/2003 Okayasu et al. ............. 439/587

FOREIGN PATENT DOCUMENTS

JP    6-68927    3/1994

\* cited by examiner

*Primary Examiner*—Alexander Gilman
(74) *Attorney, Agent, or Firm*—Gerald E. Hespos; Anthony J. Casella

(57) ABSTRACT

A holding wall (6) of a connector housing (1) has terminal holding holes (7) for receiving terminal fittings. Two tight holding walls (11) are formed at opposite sides of each terminal holding hole (7) on the outer surface of the holding wall (6). The terminal fitting is pressed into the terminal holding hole (7) and between the tight holding walls (11). Further, the terminal holding holes (7) are formed by molding pins (14) having a length substantially equal to the thickness of the holding wall (6) and contact plates (13) that contact the leading ends of the molding pins (14). Thus, the molding pins (14) can be short and are less likely to deform when subjected to pressure from resin during molding.

12 Claims, 6 Drawing Sheets

CONNECTOR, A FORMING MOLD THEREFOR

BACKGROUND OF THE INVENTION

1. Field of the Invention

The invention relates to a connector and to a forming mold therefor.

2. Description of the Related Art

Japanese Unexamined Patent Publication No. H06-68927 discloses a connector with a housing that has a terminal holding wall. Terminal holding holes penetrate the terminal holding wall. The connector of Japanese Unexamined Patent Publication No. H06-68927 also has tab-shaped terminal fittings made entirely of narrow metal bars. The terminal fittings are cross-sectionally larger than the terminal holding holes and are held by being pressed into the terminal holding holes.

Forces for holding the terminal fittings in the terminal holding holes are obtained from pressing forces of the walls of the hole. Thus, these connectors require a sufficiently long holding hole for holding the pressed-in terminal fittings. Connectors of this type generally thicken only areas where the terminal holding holes are formed rather than thickening the entire terminal holding wall.

The above-described housing is formed by molds 50, 51, as shown in FIG. 7. Molding pins 52 for forming terminal holding holes 53 project from the mold 50 and have a sufficient length to penetrate through thick holding areas 54 for holding the terminal fittings.

Manufacturers of connectors have been forced to make terminals narrower to meet demands for miniature connectors. Accordingly, molding pins must be narrower, and the narrow molding pins may not have sufficient strength. Specifically, there is a possibility that the narrow molding pins will deform when subjected to an injection pressure of resin during molding. Then, the terminal holding holes might not be formed properly, for example, due to deviation from the specified positions.

The invention was developed in view of the above, and an object thereof is to provide a forming mold and molding method enabling terminal holding holes to be formed properly and a connector formed using such a mold.

SUMMARY OF THE INVENTION

The invention relates to a connector with a housing formed with a holding wall. One or more terminal holding holes penetrate the holding wall and extend between the inside and outside of the housing. The connector also includes one or more terminal fittings that are pressed into and through the terminal holding holes. One or more tight holding walls are formed on the outer surface of the holding wall and project at least partly around each terminal holding hole while being spaced from each other. The tightly holding walls are capable of tightly holding the terminal fitting Accordingly, a part of each terminal fitting projecting back from the terminal holding hole receives pressing forces from the tight holding walls and can be held tightly by the tight holding wall. Thus, a sufficient holding force is obtained to prevent the terminal fitting from coming out.

The walls of the terminal holding holes conventionally extended out of the holding wall and were continuous over the entire circumference without interruption. Long narrow pins were required for forming the conventional terminal holding holes and necessarily extended from one mold. However, the connector of the subject invention has separated tight holding walls for holding the terminal fittings. The terminal holding holes can be formed by two molds arranged at the inner and outer sides of the holding wall. One mold can be moved until reaching the outer surface of the holding wall. Accordingly, it is sufficient for the parts for forming the terminal holding holes to have a length substantially equal to the thickness of the holding wall. These parts have high strength and are not deformed by an injection pressure during molding. Therefore, the terminal holding holes are formed properly.

Two tight holding walls preferably are provided at opposite sides of each terminal holding hole.

The distance between the facing surfaces of both tight holding walls and the cross-sectional dimension of each terminal holding hole preferably are slightly smaller than an outside diameter of the terminal fitting.

The walls of each terminal holding hole and the wall of the corresponding tight holding wall preferably are continuous in the length direction. Accordingly, the terminal fittings can be held with uniform holding forces from the terminal holding holes to the tight holding walls.

One or more widened recesses preferably are formed at the opening edges of the respective terminal holding holes in the inner surface of the holding wall. The widened recesses preferably are formed in an arranging direction of the tight holding walls. The widened recesses reduce the thickness of the holding wall in parts where the tight holding walls are provided. Therefore, forces necessary to insert the terminal fittings can be reduced.

The invention also relates to a forming mold with first and second main bodies for forming the above-described connector housing. The first and second main bodies are formed respectively with opposed first and second molding surfaces, and a molding space is defined between the molding surfaces for forming the holding wall of the housing. The first molding surface forms the inner surface of the holding wall and the second molding surface forms the outer surface of the holding wall. The mold main bodies can be opened substantially along a penetrating direction of the terminal fittings. One or more molding pins project from the first molding surface at positions that will define the terminal holding holes. Each molding pin has an outside dimension equal to or slightly smaller than that of the terminal fitting. One or more contact plates project from the second molding surface at positions corresponding to the terminal holding holes. Each contact plate has a thickness substantially equal to an outside diameter of the molding pin. A contact surface is formed at the leading end of each contact plate and abuts a leading end of the molding pin when the mold is closed. The molding pins preferably have a length substantially equal to the length of the terminal holding holes.

The molding surfaces of the two mold main bodies face each other when the mold is closed to define the molding space for the connector therebetween. At this time, the molding pins and the contact surfaces of the contact plates abut each other at positions corresponding to the terminal holding holes. Thus, the holding wall formed with the terminal holding holes penetrating therethrough is formed by filling resin into the molding space.

As described above, the molding pins have a length substantially equal to the entire length of the terminal holding holes (thickness of the holding wall), and hence are stronger than in the prior art. Thus, the molding pins do not deform even if subjected to the pressure of the resin during the molding. Therefore, the connector can be formed with higher accuracy.

Plural molding pins preferably are arranged substantially side by side on the first molding surface, and the contact plates preferably are arranged at substantially the same intervals as the molding pins on the second molding surface. Thus, molding sections are defined between the adjacent contact plates for forming the tight holding walls that project from the outer surface of the connector at opposite sides of each terminal holding hole in such a manner as to tightly hold the terminal fittings in lengthwise direction.

Accordingly, the terminal holding holes are formed by the contact of the molding pins and the contact plates. Additionally, the tight holding walls projecting from the rear surface of the connector at the opposite sides of the respective terminal holding holes are formed simultaneously from the resin filled between the adjacent contact plates. The tight holding walls formed in this way enable the connector to hold the terminal fittings reliably.

A base may be formed at the base end of each molding pin and is widened laterally from a shaft of the molding pin towards opposite sides with respect to an arranging direction of the terminal holding holes. Thus, the inner surface of the holding wall has wide recesses adjacent to opposite sides of the terminal holding holes with respect to the arranging direction. The bases are thicker than the shafts and make the molding pins strong. Additionally, base ends of the tight holding walls at opposite sides of the terminal holding holes are thinned because of the recesses at the opening edges of the terminal holding holes. Therefore, there is an additional effect of enabling the terminal holding holes to be widened smoothly for inserting the terminal fittings.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
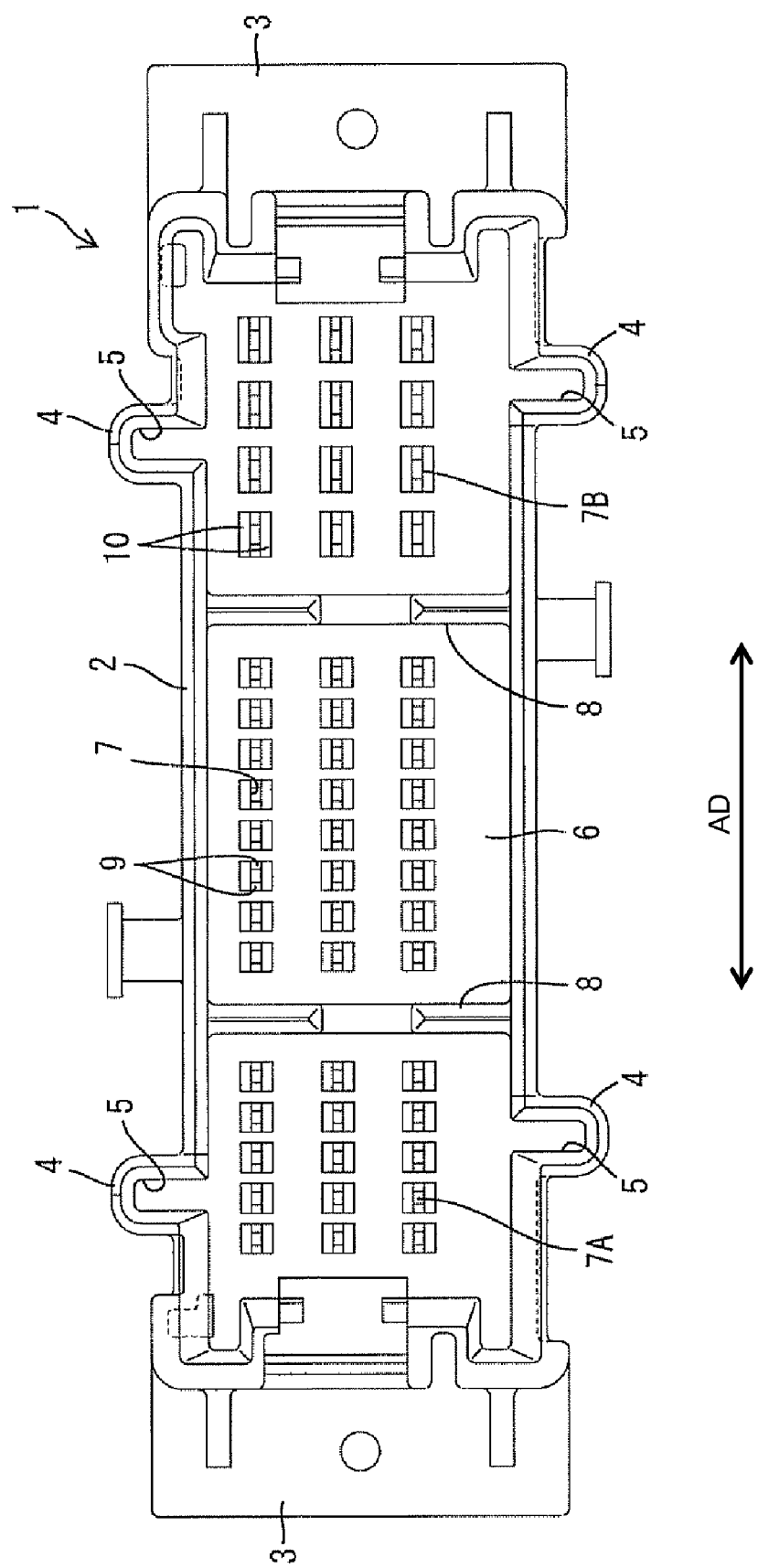
FIG. 1 is a front view of a connector housing.
Figure 2:
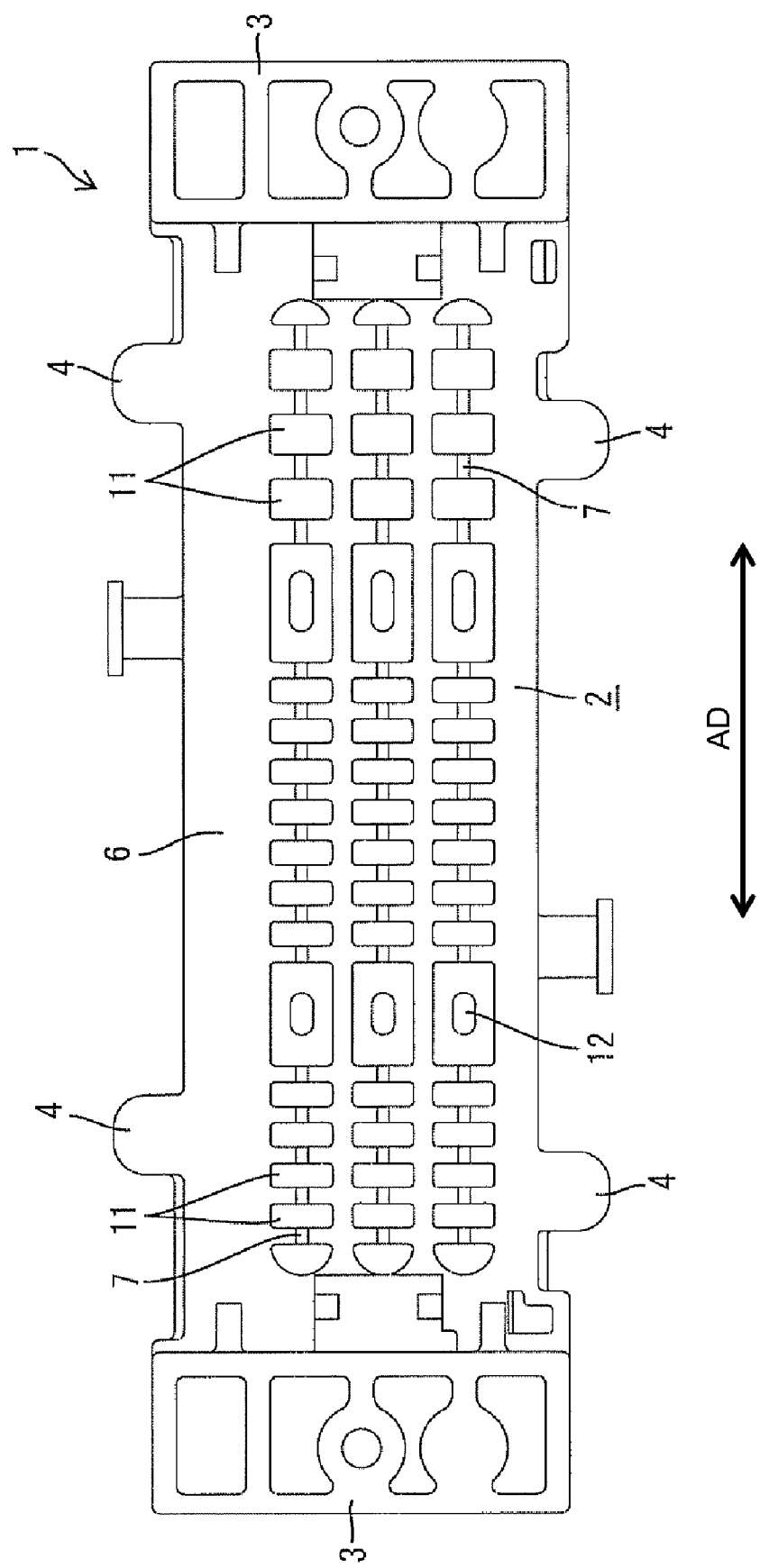
FIG. 2 is a rear view of the connector housing.

A circuit board connector in accordance with the invention has a housing identified generally by the numeral 1 in FIGS. 1 to 4 and 6. The housing 1 is formed unitarily of a synthetic resin and includes a main body 2 in the form of a substantially rectangular tube with an open front for receiving a mating connector (not shown). Two bulges 3 are formed at the rear ends of the opposite shorter side surfaces of the main body 2 and are used to mount the housing 1 and two guides 4 project from each of the opposite longer side surfaces of the main body 2. Guide grooves 5 extend back in the respective guides 4 and are engageable with guide ribs (not shown) of a mating housing. Proper engagement of the guide ribs and the guide grooves 5 guide the connection of the two housings and prevent a connection if one of the housings is oriented improperly.

A holding wall 6 is formed at the back of the main body 2 and functions for holding terminal fittings. Although not shown in detail, the terminal fittings are narrow bar-shaped members made of an electrically conductive material, such as metal. Terminal holding holes 7 are formed through the terminal holding wall 6 and terminal fittings can be inserted forward through the terminal holding holes 7 into the main body 2. In the illustrated example, the terminal holding holes 7 are arranged transversely in an arranging direction AD at upper, middle and lower rows, as shown in FIG. 1.

Figure 3:
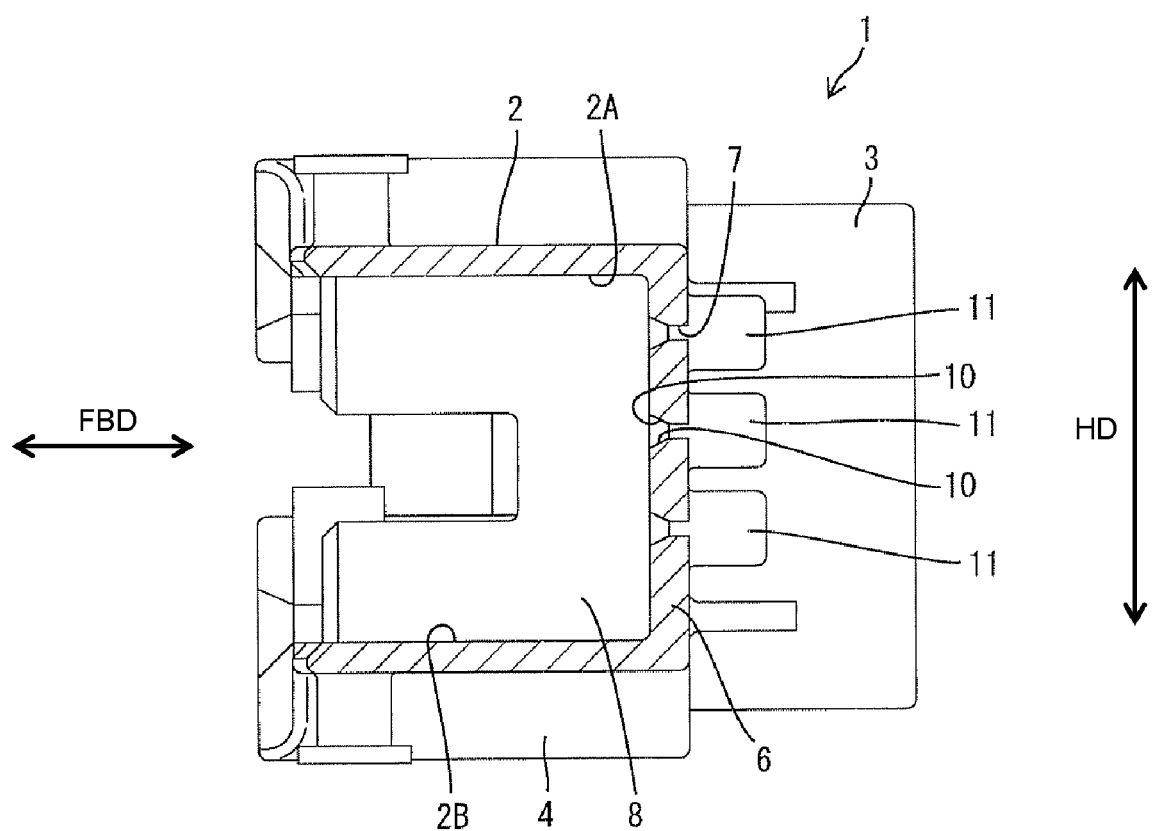
FIG. 3 is a section along A-A of FIG. 1.

Partition walls 8 are formed in the main body 2, as shown in FIGS. 1 and 3, to divide the inner space of the main body 2 into chambers. The partition walls 8 have forwardly open U-shaped concavities. Each partition wall 8 extends from the terminal holding wall 6 of the main body 2 to the opening edge and connects with a ceiling wall 2A and a bottom wall 2B of the main body 2.

In this embodiment, the terminal holding holes 7A in the left chamber and the terminal holding holes 7A in the middle chamber in FIG. 1 have the same size and are arranged at the substantially same intervals. However, the terminal holding holes 7B in the right chamber preferably are larger and are arranged at larger intervals than those in the other two chambers, e.g. because larger terminal fittings are to be mounted therethrough.

Figure 4:
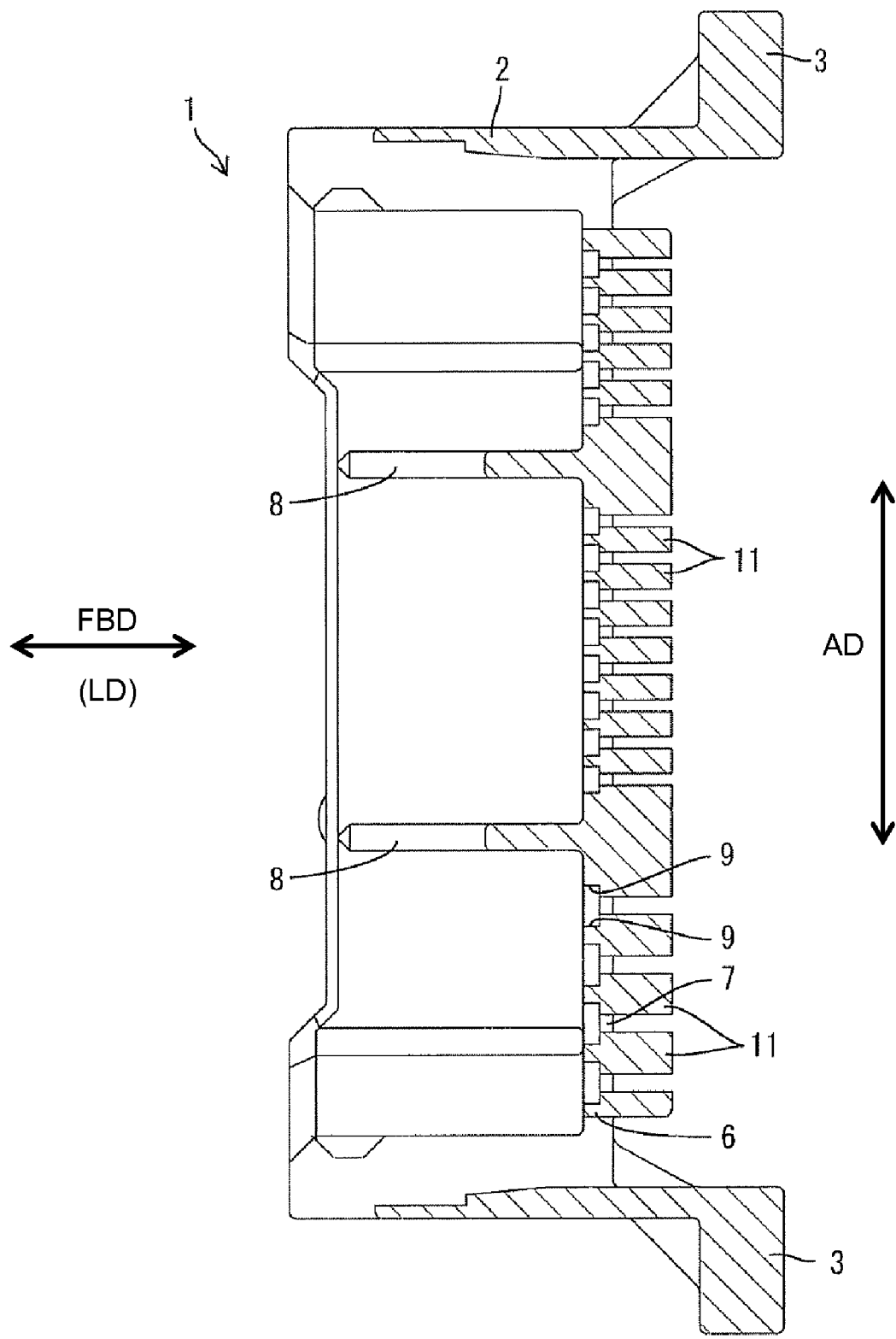
FIG. 4 is a section along B-B of FIG. 1.
Figure 5:
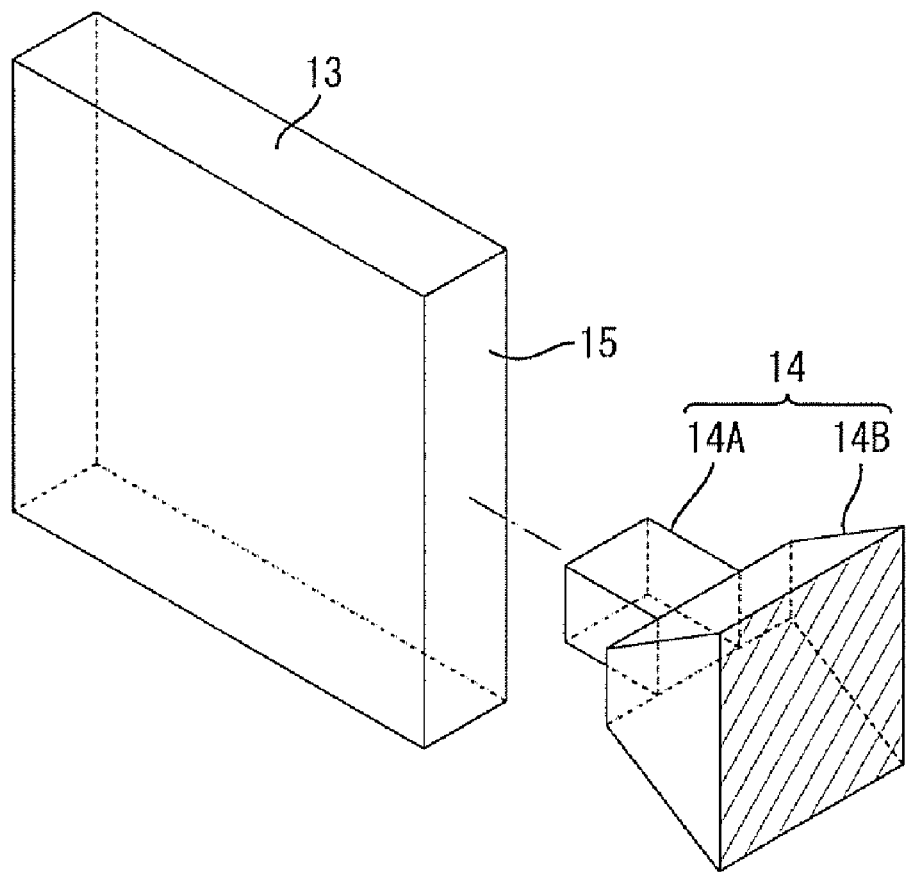
FIG. 5 is a perspective view of a molding pin and a contact plate.

The respective terminal holding holes 7 are substantially rectangular and conform with the cross-sectional shapes of the terminal fittings to be inserted therein. The cross sections of the respective terminal holding holes 7 are slightly smaller than the cross section of the corresponding part of the terminal fittings, so that the terminal fittings are held tightly and positioned. Further, as shown in FIG. 4, widened recesses 9 are formed on the inside of the main body 2 at opposite sides of the terminal holding holes 7 along the arrangement direction AD. The recesses 9 have depths substantially equal to the height of the terminal holding hole 7. The holding wall 6 is thinned locally and weakened by the widened recesses 9. Thus, the terminal holding holes 7 can be widened more easily when the terminal fittings are being inserted into the terminal holding holes 7.

Two slanted surfaces 10 are formed at the inside of the main body 2 at opposite sides of each terminal holding hole 7 in the height direction HD. The slanted surfaces 10 are arranged to diverge towards the front. The opposite widthwise ends of the slanted surfaces 10 are aligned with the outer ends of the widened recesses 9 described above.

Tight holding walls 11 project unitarily out from the rear surface of the holding wall 6 at the widthwise sides of the terminal holding holes 7. The tight holding walls 11 at opposite sides of each terminal holding hole 7 have facing surfaces substantially flush and continuous with inner wall surfaces of the terminal holding hole 7. Each tight holding wall 11 has a thickness equal to the spacing between the rear opening edges of the adjacent terminal holding holes 7. However, the tight holding walls 11 at positions corresponding to the partition walls 8 are wider than the others and have recesses 12 perforated in their rear surfaces to prevent "sinks" during molding.

Figure 6:
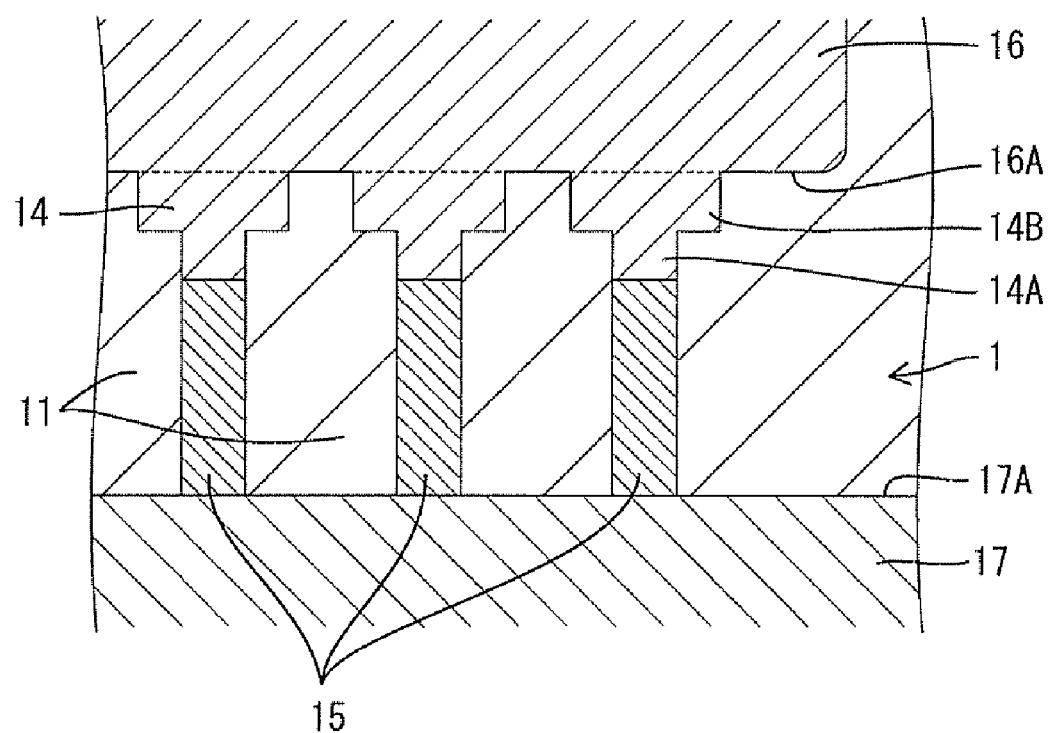
FIG. 6 is a section enlargedly showing a state where the molding pins and the contact plates abut on each other when molds are closed.

The housing 1 is formed using first and second molds 16, 17 that can be opened and closed along forward and backward directions FBD of the main body 2. First and second molding surfaces 16A, 17A of the respective first and second molds 16, 17 are opposed to each other and define a molding space for forming the holding wall 6 of the main body 2. FIG. 6 shows parts of the both molding surfaces 16A, 17A, by which the respective terminal holding holes 7 and their peripheral parts are formed. The second molding surface 17A of the second mold 17 forms the outer side of the holding wall 6. A contact plate 13 projects from a position on the second molding surface 17A corresponding to each terminal holding hole 7.

The contact plate 13 has a thickness substantially equal to the width of the corresponding terminal holding hole 7. A molding space with a dimension substantially equal to the thickness of the tight holding wall 11 is defined between adjacent contact plates 13, and the tight holding wall 11 can be formed in this space. The height of the contact plate 13 is substantially equal to the height of the tight holding wall 11 to be formed. The first molding surface 16A of the first mold 16 forms the inner side of the holding wall 16. Molding pins 14 project from the first molding surface at positions corresponding to a middle part of the leading end contact surface 15 of the contact plate 13. Each molding pin 14 has a base 14B at the first molding surface 16A and a shaft 14A that projects from the base 14B. The shaft 14A is a short rectangular column at the leading side of the molding pin 14, and has a length substantially equal to that of each terminal holding hole 7 in longitudinal direction (thickness of the holding wall 6). The width of each shaft 14A is substantially equal to the thickness of the contact surface 15 of the contact plate 13. The leading ends of the shafts 14A closely abut the middle parts of the contact surfaces 15 of the contact plates 13 in the height direction HD when the molds 16, 17 are closed. The opposite surfaces of the bases 14B spaced apart in width direction are vertical surfaces substantially parallel to the opposite side surfaces of the shafts 14A, whereas the upper and lower surfaces are inclined surfaces that slope up and down towards the shafts 14A.

A molding space for the housing 1 is defined between the molding surfaces 16A, 17A when the molds 16, 17 are closed. Simultaneously, the contact surfaces 15 of the respective contact plates 13 and the leading end surfaces of the shafts 14A of the molding pins 14 closely abut each other. In this state, molten resin is injected into the molding space. The molds 16, 17 are opened after solidification of the resin and the housing 1 is removed.

The shafts 14A of the molding pins 14 have a short length equal to the length of the terminal holding holes 7, and therefore are stronger than conventional molding pins. Thus, the shafts 14A do not deform easily, even when subjected to an injection pressure of the resin. Therefore, the terminal holding holes 7 can be formed accurately.

The terminal holding holes 7 are shortened and their holding forces holding the terminal fittings might be reduced. However, the terminal fitting inserted into the corresponding terminal holding hole 7 is held tightly between the inner surfaces of the corresponding tight holding walls 11. Therefore the terminal fittings are held with forces comparable to the conventional ones.

The terminal fittings are inserted into the terminal holding holes from the inner side of the housing, and are guided by the upper and lower slanted surfaces 10 of the respective terminal holding holes 7. The terminal fitting then is pushed strongly into the terminal holding hole 7. Thus, the terminal fitting penetrates through the terminal holding hole 10 and is moved forcibly between the tightly holding walls 11. The base ends of the tight holding walls 11 are thinned by the widened recesses 9. Thus, the tightly holding walls 11 are widened relatively easily, thereby reducing burdens on an operator.

The invention is not limited to the above described and illustrated embodiment. For example, the following embodiments are also embraced by the technical scope of the invention as defined by the claims. Besides the following embodiments, various changes can be made without departing from the scope and gist of the invention.

The molding pins project only from one mold in the foregoing embodiment. However, molding pins may be provided in the both molds and the terminal holding holes may be formed by the contact of the molding pins of both molds.

The respective tight holding walls are provided at opposite sides of the corresponding terminal holding holes with respect to the direction in which the terminal holding holes are arranged. However, the tight holding walls may be at the opposite sides of the terminal holding holes with respect to a height direction substantially normal to the above direction.

The terminal fitting is inserted into the terminal holding hole from the inner side of the main body in the illustrated example. However, terminal fitting may be inserted from behind the main body and into the terminal holding hole between the tight holding walls. In such a case, the tight holding walls may be widened beforehand using, for example, a jig. By doing so, the entrances of the terminal holding hole can also be widened so that the inserting operation of the terminal fitting can be performed more smoothly and easily.

Two tight holding walls are formed at each terminal holding hole in the foregoing embodiment. However, the number of the tight holding walls for each terminal holding hole should be not be limited. For example, one, three or more tight holding walls may be provided around the terminal holding hole while being spaced apart from each other.

The tight holding walls may have a groove substantially flush with the terminal holding hole to accommodate or surround a terminal fitting inserted thereinto so that the tight holding walls can hold the respective terminal fitting.

What is claimed is:

1. A connector comprising a housing having a substantially tubular main body with an open front end and a rear end opposite the front end, a holding wall at the rear end of the main body, the holding wall having an inner surface facing towards the front end and into the substantially tubular main body of housing, the holding wall further having an outer surface facing rearwardly on an exterior surface of the housing, at least one terminal holding hole penetrating the holding wall from the outer surface to the inner surface, and at least two spaced apart tight holding walls projecting from the outer surface of the holding wall and in proximity to the terminal holding hole and at opposite sides of the terminal holding hole.

2. The connector of claim 1, wherein a spacing between opposed surfaces of the tight holding walls and a cross-sectional dimension of the terminal holding hole measured transverse to the opposed surfaces of the tight holding walls are substantially equal.

3. The connector of claim 1, wherein the terminal holding hole has at least two inner surface regions substantially flush respectively with the tight holding walls.

4. The connector of claim 1, wherein the holding hole extends in a length direction substantially normal to the inner and outer surfaces of the holding wall, the tight holding walls have opposed surfaces facing one another and aligned substantially parallel to the length direction.

5. The connector of claim 1, wherein the substantially tubular main body has a plurality of side walls extending between the front and rear ends thereof, the holding wall being unitary with the side walls of the tubular main body.

6. A connector, comprising a housing having a holding wall with an inner surface facing into the housing and an outer surface facing out of the housing, at least one terminal holding hole penetrating the holding wall from the outer surface to the inner surface, and at least two spaced apart tight holding walls projecting from the outer surface of the holding wall and in proximity to the terminal holding hole, wherein the inner surface of the holding wall includes at least one widened recess adjacent the terminal holding hole, the widened recess being disposed to register with a portion of one of the tight holding walls projecting from the outer surface of the holding wall.

7. A connector with a housing having a substantially tubular main body with an open front end and a rear end opposite the front end, a holding wall extending across the rear end of the substantially tubular main body, the holding wall having an inner surface facing forwardly and into the substantially tubular main body of the housing, the holding wall further having an outer surface facing rearwardly on an exterior surface of the housing, a plurality of spaced apart terminal holding holes penetrating the holding wall from the outer surface to the inner surface and arranged along an arranging direction, a plurality of tight holding walls projecting rearwardly from the outer surface of the holding wall and on the exterior surface of the housing, the tight holding walls being spaced apart along the arranging direction and being disposed so that each of the terminal holding holes is disposed between two of the tight holding walls.

8. The connector of claim 7, wherein each of the terminal holding holes has at least two inner surface regions substantially flush respectively with surfaces of two of the tight holding walls.

9. The connector of claim 7, wherein each of the holding holes extends in a length direction substantially normal to the inner and outer surfaces or the holding wall, the tight holding walls in each of the pairs have opposed surfaces facing one another and aligned substantially parallel to the length direction.

10. The connector of claim 7, wherein the inner surface of the holding wall includes two recesses adjacent each of the terminal holding holes and widened in the arranging direction, the recesses being disposed to register with portions of one of the tight holding walls projecting from the outer surface of the holding wall.

11. The connector of claim 7, wherein the substantially tubular main body has a plurality of side walls extending between the front and rear ends thereof, the holding wall being unitary with the side walls of the tubular main body.

12. The connector of claim 11, wherein the tight holding walls are unitary with the holding wall.

* * * * *